US012687437B2

(12) United States Patent (10) Patent No.: US 12,687,437 B2
Yoo et al. (45) Date of Patent: Jul. 21, 2026

(54) ELECTRONIC DEVICE INCLUDING SENSOR MODULE

(71) Applicant: SAMSUNG ELECTRONICS CO., LTD., Suwon-si (KR)

(72) Inventors: Hyunguk Yoo, Suwon-si (KR); Injo Jeong, Suwon-si (KR); Jeahyuck Lee, Suwon-si (KR); Seongwook Jo, Suwon-si (KR); Younghyun Kim, Suwon-si (KR); Seungwon Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 682 days.

(21) Appl. No.: 18/088,611

(22) Filed: Dec. 25, 2022

(65) Prior Publication Data

US 2023/0204432 A1      Jun. 29, 2023

Related U.S. Application Data

(63) Continuation of application No. PCT/KR2022/021230, filed on Dec. 23, 2022.

(30) Foreign Application Priority Data

Dec. 24, 2021    (KR) ........................ 10-2021-0187540
Mar. 18, 2022    (KR) ........................ 10-2022-0034280

(51) Int. Cl.
*G01K 1/143*        (2021.01)
*G01J 5/06*         (2022.01)
          (Continued)

(52) U.S. Cl.
CPC ................ *G01K 1/143* (2013.01); *G01J 5/06* (2013.01); *G01J 5/08* (2013.01); *G01K 1/16* (2013.01);
          (Continued)

(58) Field of Classification Search
CPC .......... G01K 1/143; G01K 1/16; G01K 13/20; G01J 5/06; G01J 5/08; G01J 2005/065
          (Continued)

(56) References Cited

U.S. PATENT DOCUMENTS

2005/0117626 A1    6/2005   Kobayashi et al.
2012/0271121 A1    10/2012   Della Torre et al.
          (Continued)

FOREIGN PATENT DOCUMENTS

CN        103300832 A        9/2013
CN        111751026 A   *  10/2020    ............... G01K 1/14
          (Continued)

OTHER PUBLICATIONS

Translation of CN112504507A.*
          (Continued)

*Primary Examiner* — Mirellys Jagan
(74) *Attorney, Agent, or Firm* — CANTOR COLBURN LLP

(57)          ABSTRACT

An electronic device includes a housing including a first area provided to transmit light and a sensor hole formed in the first area. A circuit board is disposed inside the housing, a first sensor is connected to the circuit board, and a shield member is configured to block the sensor hole and provide a heat transfer path from exterior of the housing to the first sensor. A conductive material for heat conduction is disposed on at least a portion of the housing surrounding the sensor hole.

18 Claims, 11 Drawing Sheets

(51) Int. Cl.
| | | |
|---|---|---|
| *G01J 5/08* | (2022.01) |
| *G01K 1/16* | (2006.01) |
| *G01K 13/20* | (2021.01) |

(52) U.S. Cl.
CPC ........ *G01K 13/20* (2021.01); *G01J 2005/065* (2013.01)

(58) Field of Classification Search
USPC .................................................. 374/208, 141
See application file for complete search history.

(56) References Cited

U.S. PATENT DOCUMENTS

| | | | |
|---|---|---|---|
| 2016/0029911 A1 | 2/2016 | Lee | |
| 2016/0058375 A1 | 3/2016 | Rothkopf | |
| 2017/0102172 A1 | 4/2017 | Fu et al. | |
| 2018/0156660 A1* | 6/2018 | Turgeon | G01J 1/44 |
| 2019/0239769 A1 | 8/2019 | Lee et al. | |
| 2020/0260972 A1 | 8/2020 | Han et al. | |
| 2020/0323489 A1 | 10/2020 | Kim et al. | |
| 2022/0151554 A1 | 5/2022 | Jang et al. | |
| 2023/0032169 A1* | 2/2023 | Kim | A61B 5/02438 |
| 2023/0184599 A1* | 6/2023 | Jo | G01K 13/223 |
| | | | 600/474 |
| 2023/0414107 A1* | 12/2023 | Kim | A61B 5/01 |

FOREIGN PATENT DOCUMENTS

| | | | | | |
|---|---|---|---|---|---|
| CN | 211878435 | U | 11/2020 | | |
| CN | 112504507 | A | 3/2021 | | |
| JP | 2009-80000 | A | 4/2009 | | |
| JP | 2009-222543 | A | 10/2009 | | |
| JP | 2014-505533 | A | 3/2014 | | |
| JP | 2016-206024 | A | 12/2016 | | |
| JP | 2019-92910 | A | 6/2019 | | |
| KR | 20190096098 | A | 8/2019 | | |
| KR | 20200080343 | A | 7/2020 | | |
| KR | 20200100487 | A | 8/2020 | | |
| KR | 20200120407 | A | 10/2020 | | |
| KR | 10-2021-0001844 | A | 1/2021 | | |
| KR | 20210015250 | A | 2/2021 | | |
| KR | 10-2285514 | B1 | 8/2021 | | |
| WO | 2021/057873 | A1 | 4/2021 | | |
| WO | WO-2024177464 | A1 * | 8/2024 | ............. | A61B 5/024 |

OTHER PUBLICATIONS

International Search Report and Written Opinion for International Application No. PCT/KR2022/021230; International Filing Date Dec. 23, 2022; Date of Mailing Mar. 22, 2023; 9 Pages.
European Search Report corresponding to Application No. 22912038. 1-1218/4393381; Dated Dec. 5, 2024.
European Examination Report corresponding to Application No. 22912038.1; Dated Dec. 12, 2025.

\* cited by examiner

ELECTRONIC DEVICE INCLUDING SENSOR MODULE

CROSS-REFERENCE TO RELATED APPLICATIONS

This application is a continuation of International Application No. PCT/KR2022/021230 designating the United States, filed on Dec. 23, 2022, in the Korean Intellectual Property Receiving Office and claiming priority to Korean Patent Application No. 10-2021-0187540, filed on Dec. 24, 2021, in the Korean Intellectual Property Office, and Korean Patent Application No. 10-2022-0034280, filed on Mar. 18, 2022, in the Korean Intellectual Property Office, the disclosures of all of which are incorporated by reference herein in their entireties.

BACKGROUND

1. Field

Various embodiments of the disclosure relate to an electronic device including a sensor module.

2. Description of Related Art

An electronic device may mean a device that performs a specific function according to a program provided therein (e.g., an electronic scheduler, a portable multimedia reproducer, a mobile communication terminal, a tablet PC, an image/sound device, a desktop/laptop PC, or a vehicle navigation system), as well as a home appliance. The above-mentioned electronic devices may output, for example, information stored therein as sound or an image. As the degree of integration of electronic devices has increased and ultra-high-speed and large-capacity wireless communication has become popular, multiple functions have recently come to be provided in a single electronic device, such as a mobile communication terminal. For example, various functions, such as an entertainment function (e.g., a game function), a multimedia function (e.g., a music/video reproducing function), a communication and security function for mobile banking, a schedule management function, or an e-wallet function, are integrated in a single electronic device, in addition to a communication function. Such an electronic device is being miniaturized so that a user is able to conveniently carry the electronic device. With the development of electronic and communication technology, electronic devices have been reduced in size and weight, so that the electronic devices can be used without inconvenience even in the state in which the electronic devices are worn on a body.

An electronic device that is wearable on a user's body may be continuously maintained for a considerable time while in contact with the user's body. In addition, the electronic device may acquire various kinds of biometric information about the user and provide the information to the user. In order to provide more biometric information, there is an increasing a demand for mounting a sensor module for acquiring more biometric information inside the electronic device. In particular, in the case of a temperature sensor for measuring a user's body temperature, due to heat generated by components inside the electronic device and difficulty in securing a heat transfer path from the exterior to the interior of the electronic device, it is difficult to integrate the temperature sensor with other sensors to be integrated into the electronic device.

SUMMARY

According to various embodiments of the disclosure, it is possible to provide an electronic device in which an efficient heat transfer path from a user to a sensor module is secured.

In accordance with an aspect of the disclosure, an electronic device is provided. The electronic device may include: a housing including a first area provided to transmit light and a sensor hole formed in the first area; a circuit board disposed inside the housing; a first sensor connected to the circuit board; and a shield member configured to block the sensor hole and provide a heat transfer path from exterior of the housing to the first sensor, wherein a conductive material for heat conduction is disposed on at least a portion of the housing surrounding the sensor hole.

In accordance with an aspect of the disclosure, an electronic device is provided. The electronic device may include: a housing including a first area provided to transmit light and a sensor hole formed in the first area; a circuit board disposed inside the housing; a first sensor electrically connected to the circuit board and disposed inside the housing; a second sensor disposed to overlap the first area and including a light-emitting element and a light-receiving element; and a shield member configured to block the sensor hole and provide a heat transfer path from the exterior of the housing to the first sensor, wherein a conductive material for heat conduction is disposed in at least a portion of the housing surrounding the sensor hole.

However, the problems to be solved in the disclosure are not limited to the above-mentioned problems, and may be variously expanded without departing from the spirit and scope of the disclosure.

According to various embodiments of the disclosure, it is possible to provide an electronic device that includes a shield member having high thermal conductivity and connected to a sensor module so that the electronic device is capable of efficiently receiving body temperature from a user.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
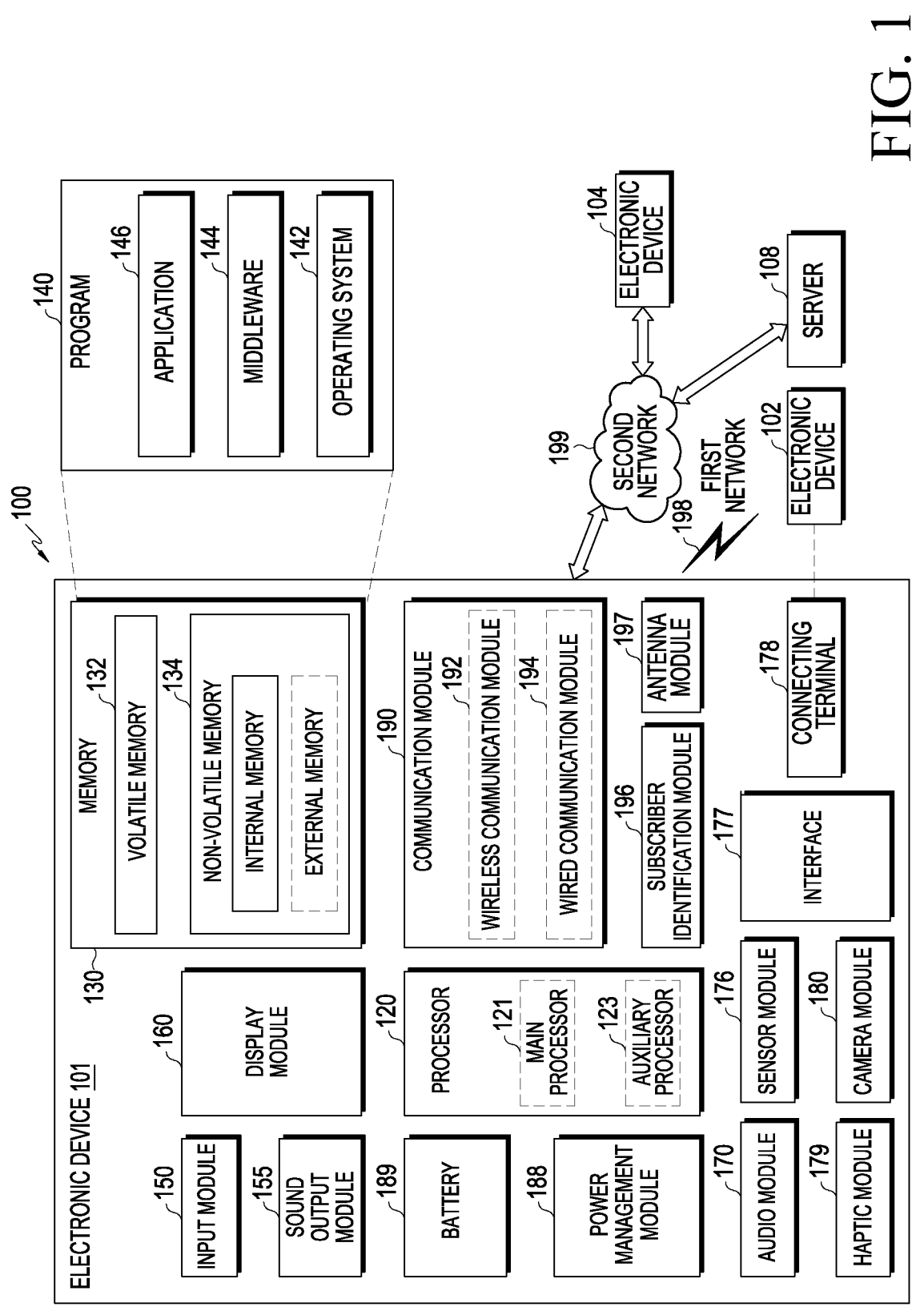
FIG. 1 is a view illustrating an electronic device according to various embodiments within a network environment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
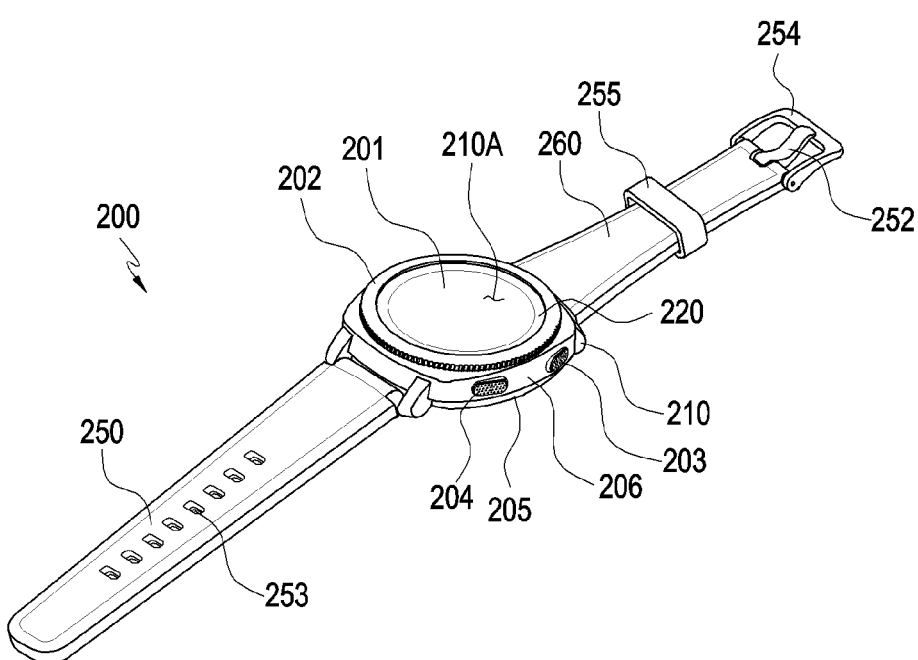
FIG. 2 is a perspective view of an electronic device according to an embodiment.
Figure 3:
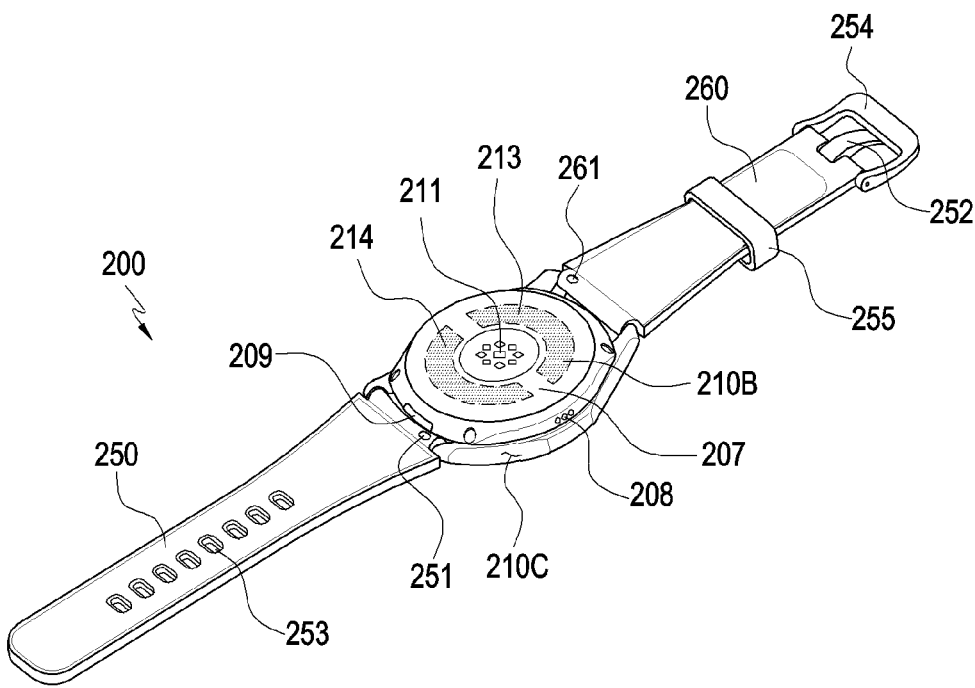
FIG. 3 is a perspective view illustrating the electronic device of FIG. 2 viewed at a different angle.

Referring to FIGS. 2 and 3, an electronic device 200 (e.g., the electronic device 101) according to an embodiment may include: a housing 210 including a first surface (or a front surface) 210A, a second surface (or a rear surface) 210B, and a side surface 210C surrounding the space between the first surface 210A and the second surface 210B. Binding members 250 and 260 are each connected to at least a portion of the housing 210 and are configured to removably bind the electronic device 200 on a portion of a body of a user (e.g., a wrist or an ankle). In an embodiment (not illustrated), the term "housing" may refer to a structure defining some of the first surface 210A, the second surface 210B, and the side surface 210C of FIG. 2. According to an embodiment, at least a portion of the first surface 210A may be defined by a substantially transparent front plate 201 (e.g., a glass plate or a polymer plate including various coating layers). The second surface 210B may be defined by a substantially opaque rear plate 207. The rear plate 207 may be made of, for example, coated or colored glass, ceramic, polymer, metal (e.g., aluminum, stainless steel (STS), or magnesium), or a combination of two or more of these materials. The side surface 210C may be provided by a side bezel structure (or a "side member") 206 coupled to the front plate 201 and the rear plate 207 and including metal and/or polymer. In some embodiments, the rear plate 207 and the side bezel structure 206 may be integrally configured, and may include the same material (e.g., a metal material such as aluminum). The binding members 250 and 260 may be formed of various materials and in various shapes. A plurality of integrated-type unit links may be disposed to be movable with respect to each other using a woven material, leather, rubber, urethane, metal, ceramic, or a combination of two or more of these materials.

According to an embodiment, the electronic device 200 may include at least one of a display 220 (see FIG. 2), audio modules 205 and 208, a sensor module 211, key input devices 202, 203, and 204, and a connector hole 209. In some embodiments, in the electronic device 200, at least one of the components (e.g., the key input devices 202, 203, and 204, the connector hole 209, or the sensor module 211) may be omitted, or other components may be additionally included.

The display 220 may be exposed through a substantial portion of, for example, the front plate 201. The shape of the display 220 may have a shape corresponding to the shape of the front plate 201, and may have various shapes such as a circle, an ellipse, and a polygon. The display 220 may be coupled to or disposed adjacent to a touch sensing circuit, a pressure sensor capable of measuring touch intensity (pressure), and/or a fingerprint sensor.

The audio modules 205 and 208 may include a microphone hole 205 and a speaker hole 208. The microphone hole 205 may include a microphone disposed therein to acquire external sound, and in some embodiments, a plurality of microphones may be disposed therein to be able to detect the direction of sound. The speaker hole 208 may be used for an external speaker and a call receiver. In some embodiments, the speaker hole 208 and the microphone hole 205 may be implemented as a single hole, or a speaker may be included without the speaker hole 208 (e.g., a piezo speaker).

The sensor module 211 may generate electrical signals or data values corresponding to the internal operating states or the external environmental states of the electronic device 200. The sensor module 211 may include, for example, a biometric sensor module 211 (e.g., an HRM sensor) disposed on the second surface 210B of the housing 210. The electronic device 200 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The sensor module 211 may include electrode areas 213 and 214 each providing a portion of the surface of the electronic device 200 and a bio signal detection circuit (not illustrated) electrically connected to the electrode areas 213 and 214. For example, the electrode areas 213 and 214 may include a first electrode area 213 and a second electrode area 214 disposed on the second surface 210B of the housing 210. The sensor module 211 may be configured such that the electrode areas 213 and 214 acquire an electrical signal from a portion of a user's body, and the bio signal detection circuit detects the user's biometric information based on the electrical signal.

The key input devices 202, 203, and 204 may include a wheel key 202 disposed on the first surface 210A of the housing 210 and configured to be rotatable in at least one direction, and/or side key buttons 203 and 204 disposed on the side surface 210C of the housing 210. The wheel key 202 may have a shape corresponding to the shape of the front plate 201. In an embodiment, the electronic device 200 may not include some or all of the above-mentioned key input devices 202, 203, and 204, and a non-included key input device 202, 203, or 204 may be implemented in another form, such as a soft key on the display 220. The connector hole 209 may accommodate a connector (e.g., a USB connector) configured to transmit/receive power and/or data to/from an external electronic device, and may include another connector hole (not illustrated) capable of accommodating a connector configured to transmit/receive an audio signal to/from an external electronic device. The electronic device 200 may further include, for example, a connector cover (not illustrated), which covers at least a portion of the connector hole 209 and blocks inflow of external foreign matter into the connector hole.

Each of the binding members 250 and 260 may be detachably fastened to at least a portion of the housing 210 by using a locking member 251 or 261. Each of the binding members 250 and 260 may include at least one of a fixing member 252, fixing member fastening holes 253, a band guide member 254, and a band fixing ring 255.

The fastening member 252 may be configured to fix the housing 210 and the binding members 250 and 260 to a portion of a user's body (e.g., a wrist or an ankle). The fixing member fastening holes 253 allow the housing 210 and the binding members 250 and 260 to be fixed to a portion of the user's body in cooperation with the fixing member 252. The band guide member 254 is configured to limit the movement range of the fixing member 252 when the fixing member 252 is fastened to any of the fixing member fastening holes 253, thereby ensuring that the binding members 250 and 260 are brought into close contact with and bound to a portion of the user's body. The band fixing ring 255 may limit the movement range of the binding members 250 and 260 in the state in which the fixing member 252 and the fixing member fastening holes 253 are fastened to each other.

Figure 4:
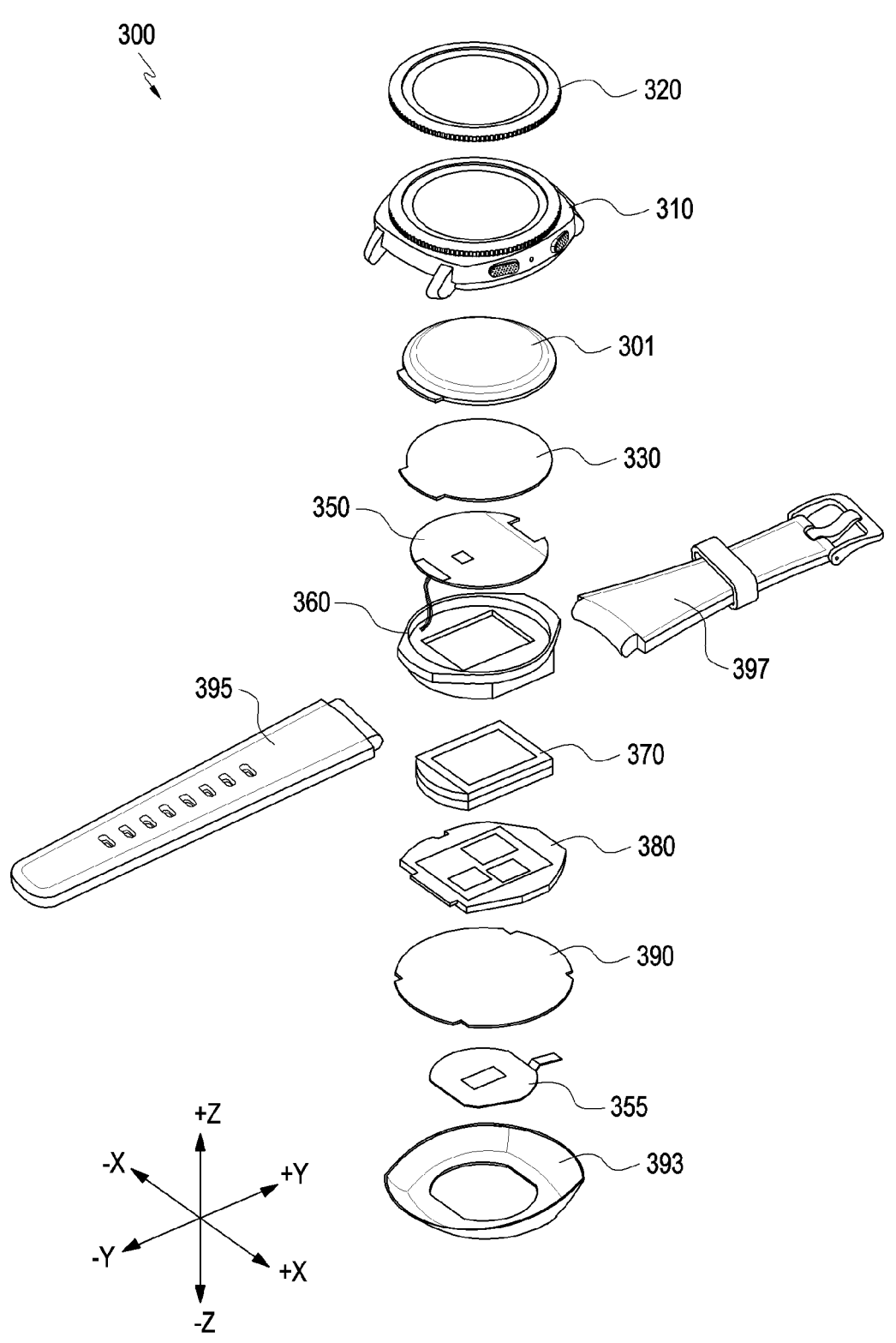
FIG. 4 is an exploded perspective view of the electronic device according to an embodiment.

Referring to FIG. 4, an electronic device 300 (e.g., the electronic device 101 in FIG. 1 or the electronic device 200 in FIG. 2 or FIG. 3) may include a side bezel structure 310, a wheel key 320, a front plate 301, a display 330, a first antenna 350, a second antenna 355, a support member 360 (e.g., a bracket), a battery 370, a printed circuit board 380, a sealing member 390, a rear plate 393, and binding members 395 and 397. At least one of the components of the electronic device 300 may be the same as or similar to at least one of the components of the electronic device 200 of FIG. 1 or FIG. 2, and a redundant description thereof will be omitted below. The support member 360 may be disposed inside the electronic device 300 and connected to the side bezel structure 310, or may be integrally configured with the side bezel structure 310. The support member 360 may be formed of, for example, a metal material and/or a non-metal (e.g., polymer) material. The support member 360 may include one surface to which the display 220 is coupled and the other surface to which the printed circuit board 380 is coupled. On the printed circuit board 380, a processor, a memory, and/or an interface may be mounted. The processor may include, for example, one or more of a central processing unit, an application processor, a graphic processing unit (GPU), an application processor sensor processor, or a communication processor.

The memory may include, for example, a volatile memory or a nonvolatile memory. The interface may include, for example, a high-definition multimedia interface (HDMI), a universal serial bus (USB) interface, an SD card interface, and/or an audio interface. The interface may electrically or physically connect, for example, the electronic device 300 to an external electronic device, and may include a USB connector, an SD card/an MMC connector, or an audio connector.

The battery 370 is a device for supplying power to at least one component of the electronic device 300, and may include, for example, a non-rechargeable primary battery, a rechargeable secondary battery, or a fuel cell. At least a portion of the battery 370 may be disposed on substantially the same plane as, for example, the printed circuit board 380. The battery 370 may be integrally disposed inside the electronic device 200, or may be disposed to be detachable from the electronic device 200.

The first antenna 350 may be disposed between the display 220 and the support member 360. The first antenna 350 may include, for example, a near field communication (NFC) antenna, a wireless charging antenna, and/or a magnetic secure transmission (MST) antenna. For example, the first antenna 350 may perform short-range communication with an external device, may wirelessly transmit/receive power required for charging, or may transmit a short-range communication signal or a magnet-based signal including payment data. In an embodiment, an antenna structure may be constituted with a portion of the side bezel structure 310 and/or a portion of the first support member 360, or a combination thereof.

The second antenna 355 may be disposed between the printed circuit board 380 and the rear plate 393. The second antenna 355 may include, for example, a near field communication (NFC) antenna, a wireless charging antenna, and/or a magnetic secure transmission (MST) antenna. For example, the second antenna 355 may perform short-range communication with an external device, may wirelessly transmit/receive power required for charging, or may transmit a short-range communication signal or a magnet-based signal including payment data. In an embodiment, an antenna structure may be constituted with a portion of the side bezel structure 310 and/or a portion of the rear plate 393, or a combination thereof.

The sealing member 390 may be located between the side bezel structure 310 and the rear plate 393. The sealing member 390 may be configured to block moisture and foreign matter flowing into the space surrounded by the side bezel structure 310 and the rear plate 393 from the exterior.

Figure 5:
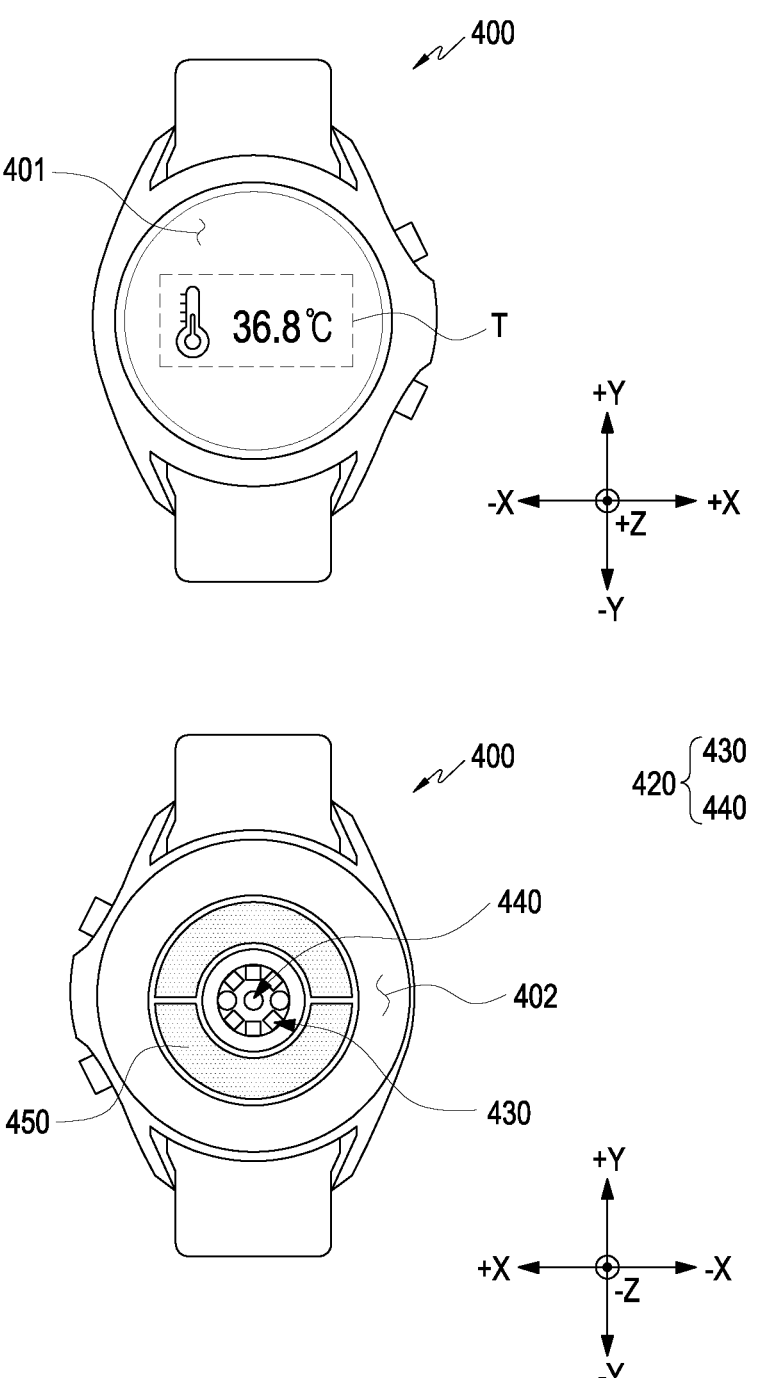
FIG. 5 illustrates an example of implementing an electronic device according to an embodiment.

FIG. 5 illustrates an example of implementing an electronic device according to an embodiment.

Referring to FIG. 5, an electronic device 400 may provide biometric information (T) via a display module 420 disposed on the front surface 401 (the surface in the +z-axis direction). In an embodiment, the biometric information (T) may include body temperature information and other health information of the user of the electronic device 400. The electronic device 400 of FIG. 5 may be wholly or partly the same as the aforementioned electronic device (e.g., the electronic devices 101, 200, and 300 of FIGS. 1 to 4).

According to an embodiment, the electronic device 400 may acquire the user's biometric information via the sensor module 420 disposed adjacent to the rear surface 402 (the surface in the −z-axis direction). In an embodiment, the sensor module 420 may include a first sensor 430 and/or a second sensor 440 disposed adjacent to the first sensor 430. For example, the sensor module 420 may include one or more of, for example, a temperature sensor, an PPG sensor, a gesture sensor, a gyro sensor, an atmospheric pressure sensor, a magnetic sensor, an acceleration sensor, a grip sensor, a color sensor, an infrared (IR) sensor, a biometric sensor, a fingerprint sensor, a humidity sensor, or an illuminance sensor. In an embodiment, an electrode sensor 450 may be disposed to surround at least a portion of the sensor module 420.

In the following description of the disclosure, for convenience of description, a case in which the first sensor 430 is a PPG sensor and the second sensor 440 is a temperature sensor will be described as an example. However, this is for illustration of some of the an embodiment, and the spirit of the disclosure should not be construed as being limited to the embodiments to be described later.

Figure 6A:
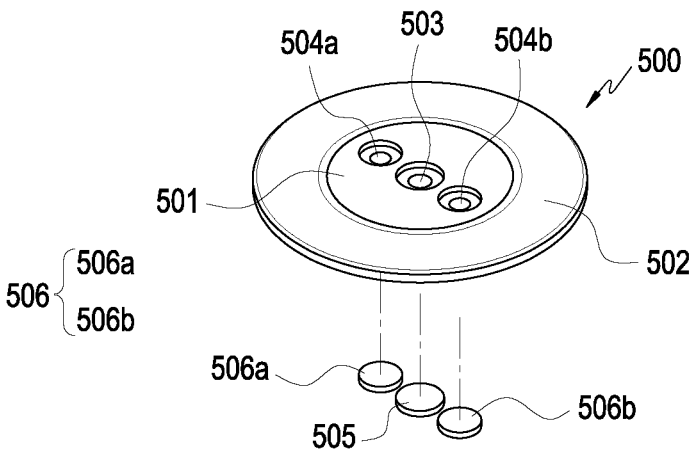
FIGS. 6A and 6C are views illustrating a support member according to an embodiment from various angles.
Figure 6B:
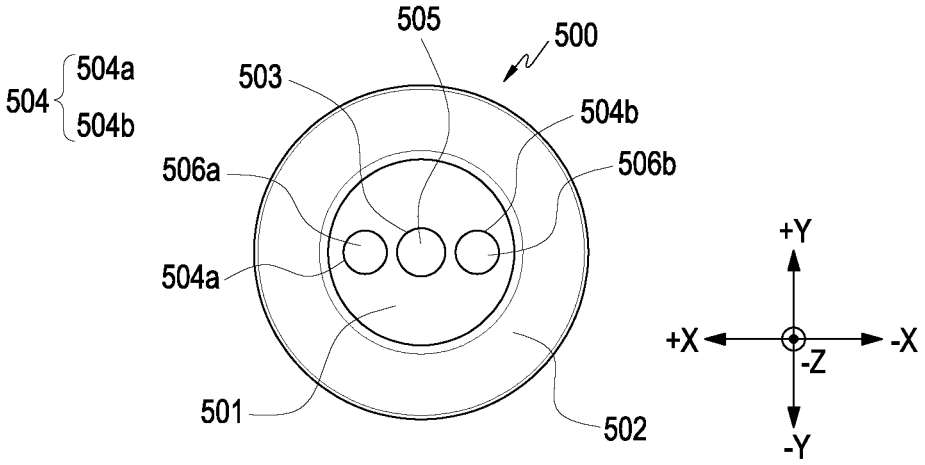
Figure 6C:
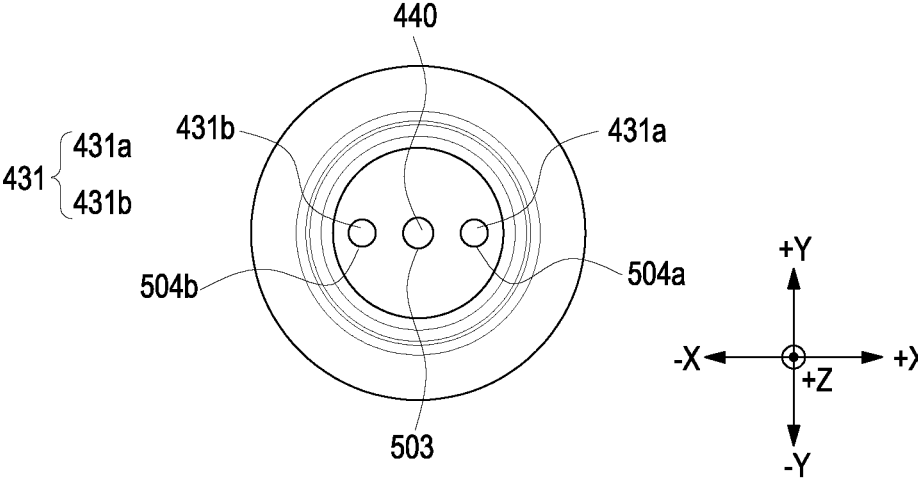

FIGS. 6A, 6B, and 6C (collectively referred to as FIGS. 6A to 6C) are views illustrating a support member 500 according to an embodiment from various angles. FIG. 6A is an exploded perspective view of the support member 500. FIG. 6B is a top view of the support member. FIG. 6C is a rear view of the support member.

Referring to FIGS. 6A to 6C, the support member 500 may include a first area 501 and a second area 502 around the first area 501. The support member 500 of FIGS. 6A to 6C may be wholly or partly the same as the housing 210 or the rear plate 207 described above with reference to FIGS. 2 and 3.

According to an embodiment, the first area 501 may be formed of a material capable of transmitting light. In an embodiment, in an electronic device (e.g., the electronic device 400 in FIG. 5), a sensor using light (e.g., a PPG sensor) may be disposed at a position adjacent to the first area 501, and the first area 501 may be formed of a light-transmitting material such that the light is transmittable to the sensor. For example, the first area 501 may be formed of at least one of glass, sapphire, plastic, and transparent ceramic.

According to an embodiment, the first area 502 may be formed of a material capable of blocking light. For example, in order to prevent light unnecessary for measuring a user's biometric information from being incident on the sensor (e.g., a PPG sensor) via the second area 502, the second area 502 may be formed of a light-blocking material.

According to an embodiment, the first area 501 and the second area 502 may be separately or integrally formed. An example in which the first area 501 and the second area 502 are integrally formed will be described later with reference to FIGS. 10A and 10B.

According to an embodiment, the support member 500 may include a plurality of openings 503 and 504. The plurality of openings 503 and 504 may provide a path through which a measurement target (e.g., light or body temperature) of a sensor module (e.g., the sensor module 420 in FIG. 5) related to a user is transferrable from the user's body to the sensor module (e.g., the sensor module 420 in FIG. 5). In an embodiment, the plurality of openings 503 and 504 may be provided in the first area 501. However, this is not essential, and a plurality of openings 503 may be provided in the second area 502, or some of the openings 503 or 504 may be provided in the first area 501 and the remaining openings 503 may be provided in the second area 502. According to an embodiment, the plurality of openings 503 and 504 may include a sensor hole 503 corresponding to a second sensor (e.g., the second sensor 440 in FIG. 5) and auxiliary holes 504 corresponding to a first sensor (e.g., the first sensor 430 in FIG. 5). The auxiliary holes 504 may include a first auxiliary hole 504a and a second auxiliary hole 504b. In an embodiment, the auxiliary holes 504 may be disposed to surround at least a portion of the sensor holes 503. For example, when the sensor hole 503 is provided near the center of the first area 501, the first auxiliary hole 504a and the second auxiliary hole 504b may be disposed on both sides of the sensor hole 503.

According to an embodiment, the support member 500 may include a plurality of shield members 505 and 506. In an embodiment, the plurality of shield members 505 and 506 may include a sensor shield member 505 to be disposed in the sensor hole 503 and auxiliary shield members 506 to be disposed in the auxiliary holes 504. The auxiliary shield members 506 may include a first auxiliary shield member 506a corresponding to the first auxiliary hole 504a and a second auxiliary shield member 506b corresponding to the second auxiliary hole 504b. According to an embodiment, the sensor shield member 505 may be formed of an opaque material. Alternatively, when the sensor shield member 505 is formed of a transparent material, an opaque coating may be further provided thereon. In addition, the auxiliary shield members 506 may be formed of a transparent material to transmit light. In an embodiment, the shield members 505 and 506 may be formed of the same material as the support member 500.

According to an embodiment, light-emitting elements 431 may be disposed in the auxiliary holes 504. The light-emitting elements 431 may include first and second light-emitting elements 431a and 431b, and the first and second light-emitting elements 431a and 431b may be disposed in the first and second auxiliary holes 504a and 504b, respectively. In an embodiment, the light-emitting elements 431 may be used in the first sensor 430 (e.g., a PPG sensor) described above with reference to FIG. 5. In addition, the second sensor 440 may be disposed in the sensor hole 503.

Figure 7:
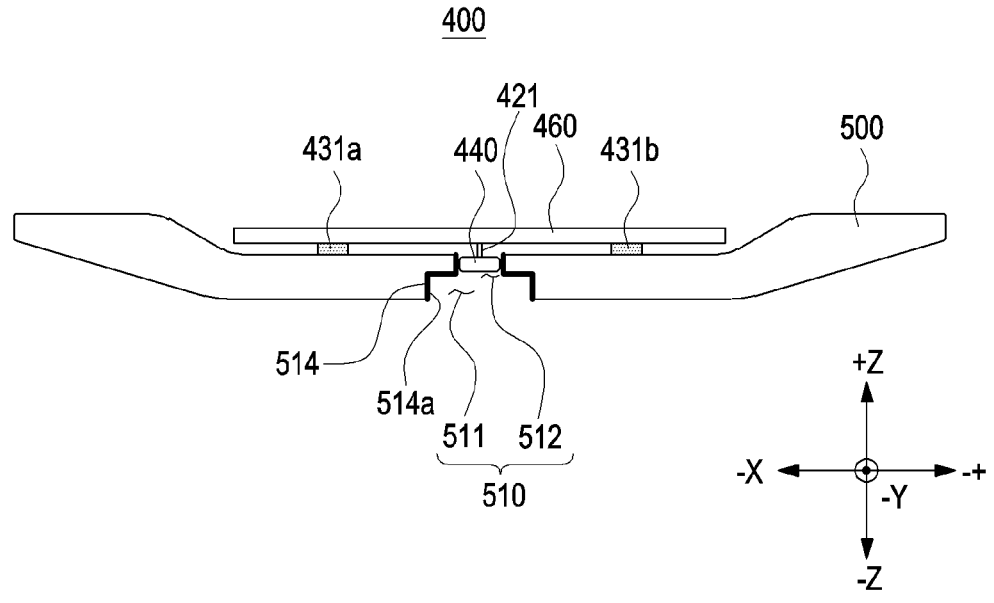
FIG. 7 is a cross-sectional side view of an electronic device according to an embodiment.
Figure 8:
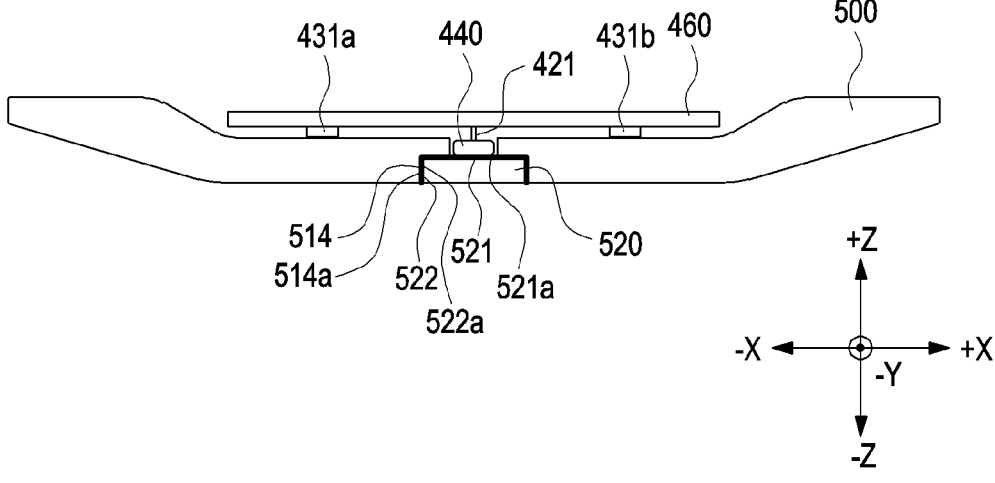
FIG. 8 is a cross-sectional side view of an electronic device which is mounted with a shield member according to an embodiment.

FIG. 7 is a cross-sectional side view of an electronic device 400 according to an embodiment. FIG. 8 is a cross-sectional side view of an electronic device 400 which is mounted with a shield member 520 according to an embodiment.

Referring to FIGS. 7 and 8, the electronic device 400 may include a support member 500, a circuit board 460, a light-emitting element 431 disposed on the circuit board 460, a second sensor 440, and a connector 421 for interconnecting the second sensor 440 and the circuit board 460.

According to an embodiment, the support member 500 may include a sensor hole 510. The sensor hole 510 of FIGS. 7 and 8 may be configured to be the same as or similar to the sensor hole 503 described above with reference to FIGS. 6A to 6C. In an embodiment, the sensor hole 510 may include a first opening area 511 and a second opening area 512. For example, the first opening area 511 may mean an outer (in the −z-axis direction) area of the sensor hole 510, and the second opening area 512 may mean an inner (in the +z-axis direction) area of the sensor hole 510. In an embodiment, the widths of the first opening area 511 and the second opening area 512 may be different from each other. For example, the width of the first opening area 511 may be greater than the width of the second opening area 512. In an embodiment, a shield member 520 may be disposed in the first opening area 511. The shapes of the shield member 520 and the first opening area 511 may correspond to each other. In an embodiment, the shield member 520 may be disposed in the sensor hole 510 via a liquid or semi-solid waterproof member as a medium. This makes it possible to further prevent foreign matter from being introduced through the sensor hole 510. In an embodiment, at least a portion of the second sensor 440 may be disposed in the second opening area 512. In one or more non-limiting embodiments, the second sensor 440 includes a first surface that faces the circuit board 460 and a second surface of the sensor 440 opposite the first surface faces the shield member 520.

According to an embodiment, the second sensor 440 may be disposed to come into contact at least a portion of the shield member 520. For example, when the second sensor 440 is a contact-type body temperature sensor, the second sensor 440 may come into contact with the shield member 520 and detect heat transferred from the shield member 520. In an embodiment, when the second sensor 440 is a non-contact-type body temperature sensor, the second sensor 440 may be disposed to be spaced apart from the shield member 520 by a predetermined distance.

According to an embodiment, a conductive material 514a can be disposed on one or both of a first inner surface defined by the first opening area first opening area 511 and a second inner surface defined by the second opening area 512. For example, a portion of the conductive material 514a may be disposed on the inner surface 514 of the support member 500 around the sensor hole 510. In an embodiment, the conductive material 514a may include a metal material. For example, the inner surface 514 may be coated with a metal material. A coating method, such as chemical vapor deposition (CVD) or sputtering, may be used, but is not limited thereto. In an embodiment, a conductive material 522a may be disposed on the side surface 522 of the shield member 520. In addition, conductive materials 514a and 522a may be disposed on both the side surface of the shield member 520 and the inner surface 514 of the sensor hole 510. The conductive material 514a may be disposed on the inner surface of the support member 500 corresponding to the first opening area 511 or may be disposed on the inner surface of the support member 500 corresponding to both the first opening area 511 and the second opening area 512. In the above and below descriptions of the present disclosure, the conductive material (e.g., the conductive material 514a disposed around the sensor hole 510) may include a highly conductive material, such as a metal, a metal oxide, or an organic conductive material. For example, at least one of indium tin oxide (ITO), a metal mesh, and a nanowire may be used.

According to an embodiment, a conductive material 521a may be disposed on at least one surface of the shield member 520. In an embodiment, the conductive material 521a may be disposed on the upper (in the +z-axis direction) surface 521 of the shield member 520. For example, the conductive material 521a may be disposed between the shield member 520 and the second sensor 440. As another example, the conductive material 521a may be disposed on one surface 521 of the shield member 520 facing the second sensor 440. As described above, the conductive material 522a may be disposed on the side surface 522 of the shield member 520.

In an embodiment, when the second sensor 440 is a contact-type body temperature sensor, the shield member 520 may be in contact with the second sensor 440. For example, the shield member 520 and the second sensor 440 may be attached to each other via an adhesive member. The adhesive member may be formed of a liquid, solid, or semi-solid state material. In an embodiment, the adhesive member may include a metal conductive material to improve thermal or electrical conductivity between the second sensor 440 and the shield member 520.

According to an embodiment, the circuit board 460 may be disposed adjacent to the support member 500. In an embodiment, a light-emitting element 431 may be disposed on the circuit board 460. The light-emitting element 431 may include first and second light-emitting elements 431a and 431b. However, this is only exemplary, and three or more light-emitting elements may be further disposed. In an embodiment, the light-emitting element 431 may be used for a first sensor (e.g., the first sensor 430 in FIG. 5). For example, when the first sensor 430 is a PPG sensor, light emitted from the light-emitting element 431 may be reflected from a user and transferred to a light-receiving element (e.g., the light-receiving element 432 in FIG. 9). According to an embodiment, in order for the light emitted from the light-emitting element 431 to be transferred to the exterior of the support member 500, the first area (e.g., the first area 501 in FIG. 9) may be formed of a transparent material.

According to an embodiment, the connector 421 may interconnect the second sensor 440 and the circuit board 460. For example, one end of the connector 421 may be connected to the second sensor 440, and the other end may be connected to the circuit board 460. The connector 421 may be implemented as, for example, at least one of a clip, a conductive sponge, and/or Poron, but is not limited thereto. As the connector 421, various members capable of physically or electrically interconnecting the second sensor 440 and the circuit board 460 may be used.

Figure 9:
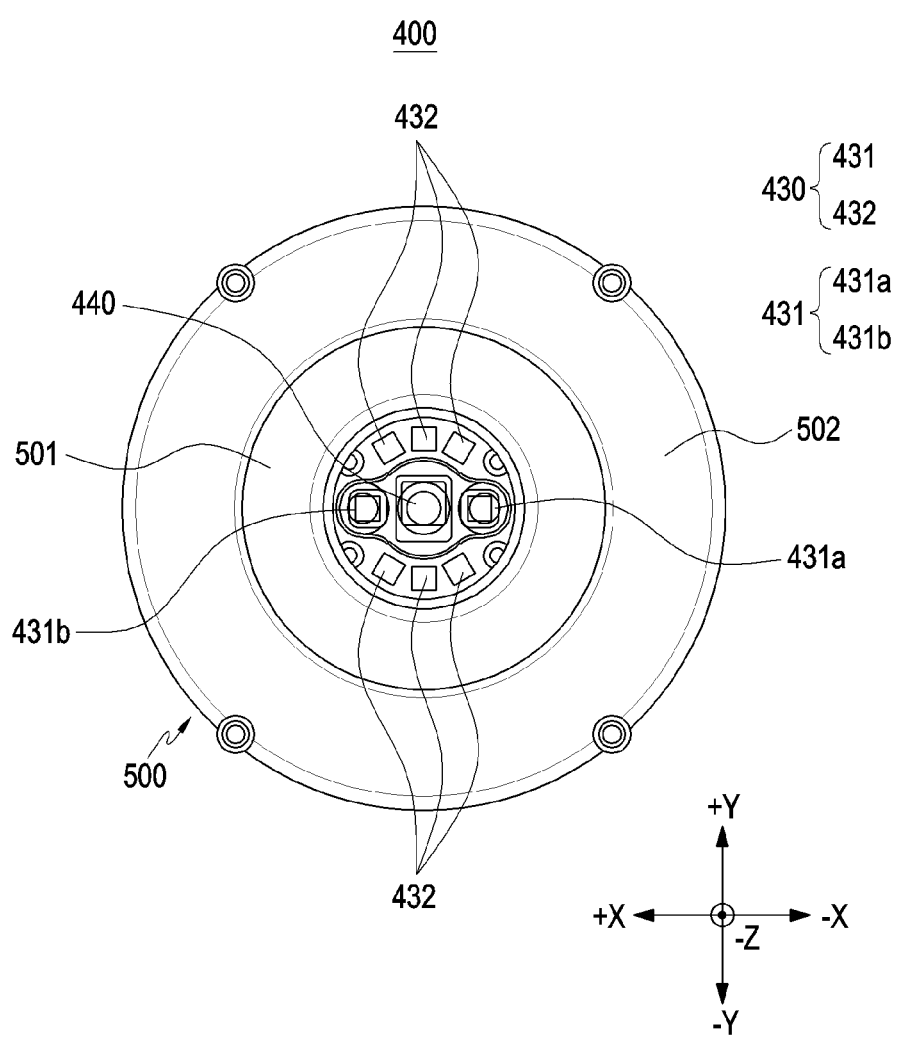
FIG. 9 is a view illustrating an arrangement relationship of sensor modules according to an embodiment.

FIG. 9 is a view illustrating an arrangement relationship of sensor modules according to an embodiment.

Referring to FIG. 9, an electronic device 400 may include a support member 500, first sensors 430, and a second sensor 440 disposed adjacent to the first sensors 430. For the descriptions of the electronic device 400 and the support member 500 of FIG. 9, the descriptions of the electronic device 400 and the support member 500 in FIGS. 5 to 8 may be applied mutatis mutandis.

According to an embodiment, the first sensors 430 and the second sensor 440 may be disposed to overlap a first area 501 of the support member 500. In an embodiment, the first sensors 430 may each include a light-emitting element 431 and a light-receiving element 432, and may emit light through the first area 501 formed of a transparent material or may receive light from the exterior.

According to an embodiment, the first sensors 430 may be disposed to surround the second sensor 440. In an embodiment, the light-emitting elements 431 and the light-receiving elements 432 may be disposed to surround the second sensor 440. As another example, it may be expressed that the second sensor 440 is disposed in an inner area of the first sensors 430 each including the light-emitting element 431 and the light-receiving element 432. In an embodiment, the first light-emitting elements 431a and the second light-emitting elements 431b may be disposed on both sides (in the x-axis direction) of the second sensor 440, and light-receiving elements 432 may be disposed above and below (in the y-axis direction) the second sensor 440. This makes it possible to cause the light emitted from the light-emitting elements 431 to be reflected from a user to be incident on the light-receiving element 432. In addition, since the second sensor 440 is disposed between the first sensors 430, the internal space efficiency of the electronic device 400 may be improved.

Figure 10A:
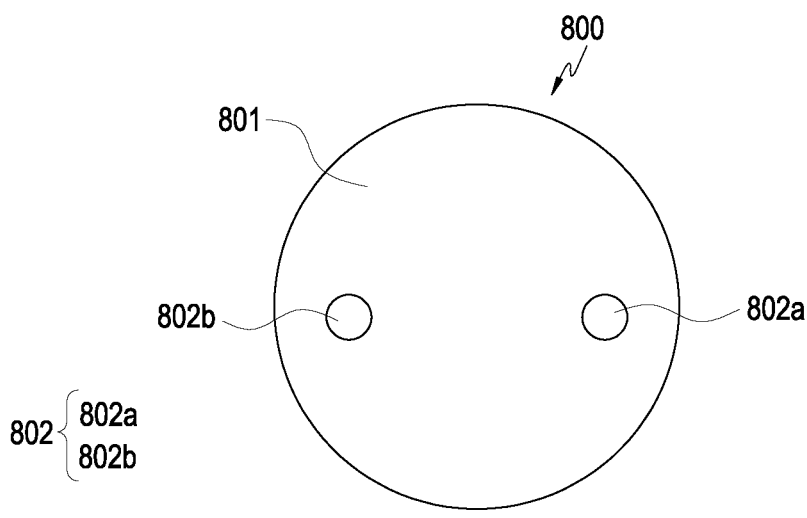
FIGS. 10A and 10B are views illustrating an internal structure of an electronic device according to an embodiment.
Figure 10B:
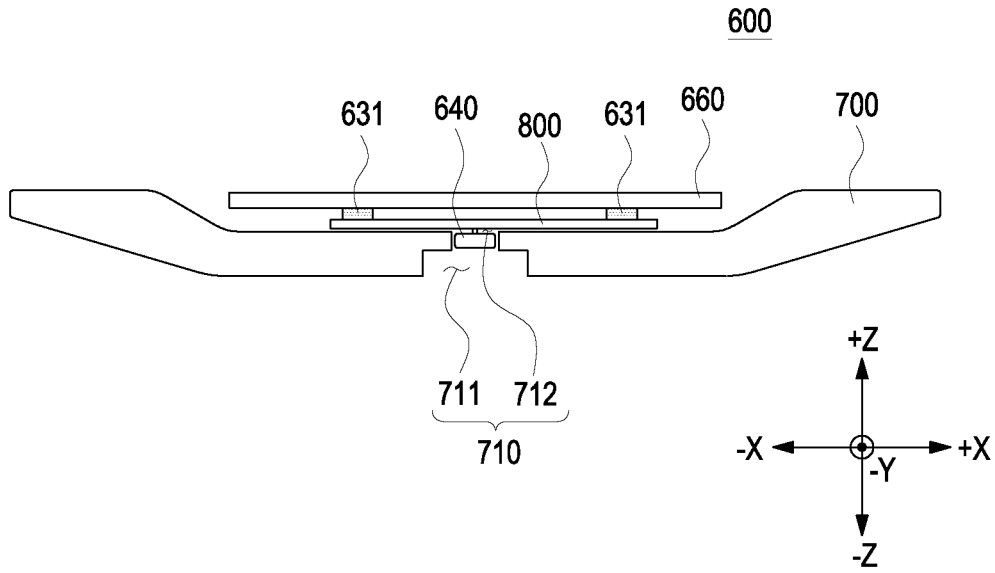

FIGS. 10A to 10B are views illustrating an internal structure of an electronic device according to an embodiment. FIG. 10A is a view illustrating an optical film according to an embodiment. FIG. 10B is a cross-sectional side view illustrating an internal structure of an electronic device including the optical film according to an embodiment.

Referring to FIGS. 10A and 10B, an electronic device 600 may further include an optical film 800. For the descriptions of the electronic device 600 of FIGS. 10A and 10B and the components of the electronic device 600 (e.g., the support member 700, the circuit board 660, and/or the second sensor 640), the descriptions of the electronic device 400 and the components of the electronic device 400 (e.g., the support member 500, the circuit board 460, and/or the second sensor 440) described above with reference to FIGS. 5 to 9 may be applied mutatis mutandis.

According to an embodiment, the optical film 800 may be disposed adjacent to light-emitting elements 631. In an embodiment, the optical film 800 may be disposed to face the circuit board 660 with the light-emitting elements 631 interposed therebetween.

According to an embodiment, the optical film 800 may be shaped to diffuse or disperse light. For example, the optical film 800 may include a Fresnel or black matrix structure. In an embodiment, the optical film 800 may include light-emitting areas 802 and a light-receiving area 801. The surfaces of the light-emitting areas 802 and the light-receiving area 801 may have different shapes. For example, the light-emitting areas 802 may have a shape for diffusing light (e.g., a Fresnel structure), and the light-receiving area 801 may include a shape for collecting light (e.g., a black matrix structure or a Fresnel structure). However, this is only an example, and the light-emitting areas 802 and the light-receiving area 801 have the same structure. In an embodiment, the light-emitting elements 631 may be disposed to correspond to the light emitting areas 802. For example, when viewed from a side of the electronic device 600 (FIG. 10B), the light-emitting element 631 may be disposed above the light emitting area 802 (in the +z-axis direction). As another example, when viewed from above the electronic device 600, the light-emitting element 631 may be disposed to at least partially overlap the light-emitting area 802. Similarly, the light-receiving element (e.g., the light-receiving element 432 of FIG. 9) may be disposed to correspond to the light-receiving area 801.

According to an embodiment, the support member 700 may include a sensor hole 710. In addition, the sensor hole 710 may include a first opening area 711 and a second opening area 712. In this regard, since the descriptions of the sensor hole 410, the first opening area 411, and the second opening area 412 described above with reference to FIGS. 7 and 8 may be applied mutatis mutandis, redundant descriptions will be omitted.

Figure 11:
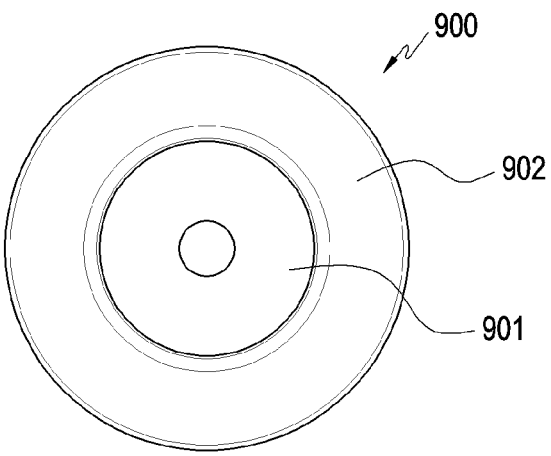
FIG. 11 is an example of implementing a support member according to an embodiments.

FIG. 11 is an example of implementing a support member 900 according to an embodiment.

Referring to FIG. 11, the support member 900 may be integrally formed with the transparent portion. For the description of the support member 900 of FIG. 11, the descriptions of the support members 500 and 700 in the above-described embodiments may be applied mutatis mutandis.

According to an embodiment, the support member 900 may include a first area 901 and a second area 902. For the descriptions of the first area 901 and the second area 902 of FIG. 11, the descriptions of the first area (e.g., the first area 501 in FIGS. 6A to 6C) and the second area (e.g., the second area 502 in FIGS. 6A to 6C) may be applied mutatis mutandis.

According to an embodiment, the first area 901 and the second area 902 may be formed of the same material. For example, the first area 901 and the second area 902 may be formed of a transparent material. In an embodiment, an opaque material may be further coated or printed on the first area 901 or the second area 902. For example, the first area 901 may be formed of a transparent material, and the second area 902 around the first area 901 may be further coated with an opaque material so that it is possible to reduce interference of light emitted from an optical sensor (e.g., the first sensor 430 in FIGS. 6A to 6C or the light-emitting element 431 in FIG. 9) or light incident on an optical sensor (e.g., the first sensor 430 of FIGS. 6A to 6C or the light-receiving element 432 in FIG. 9).

Figure 12:
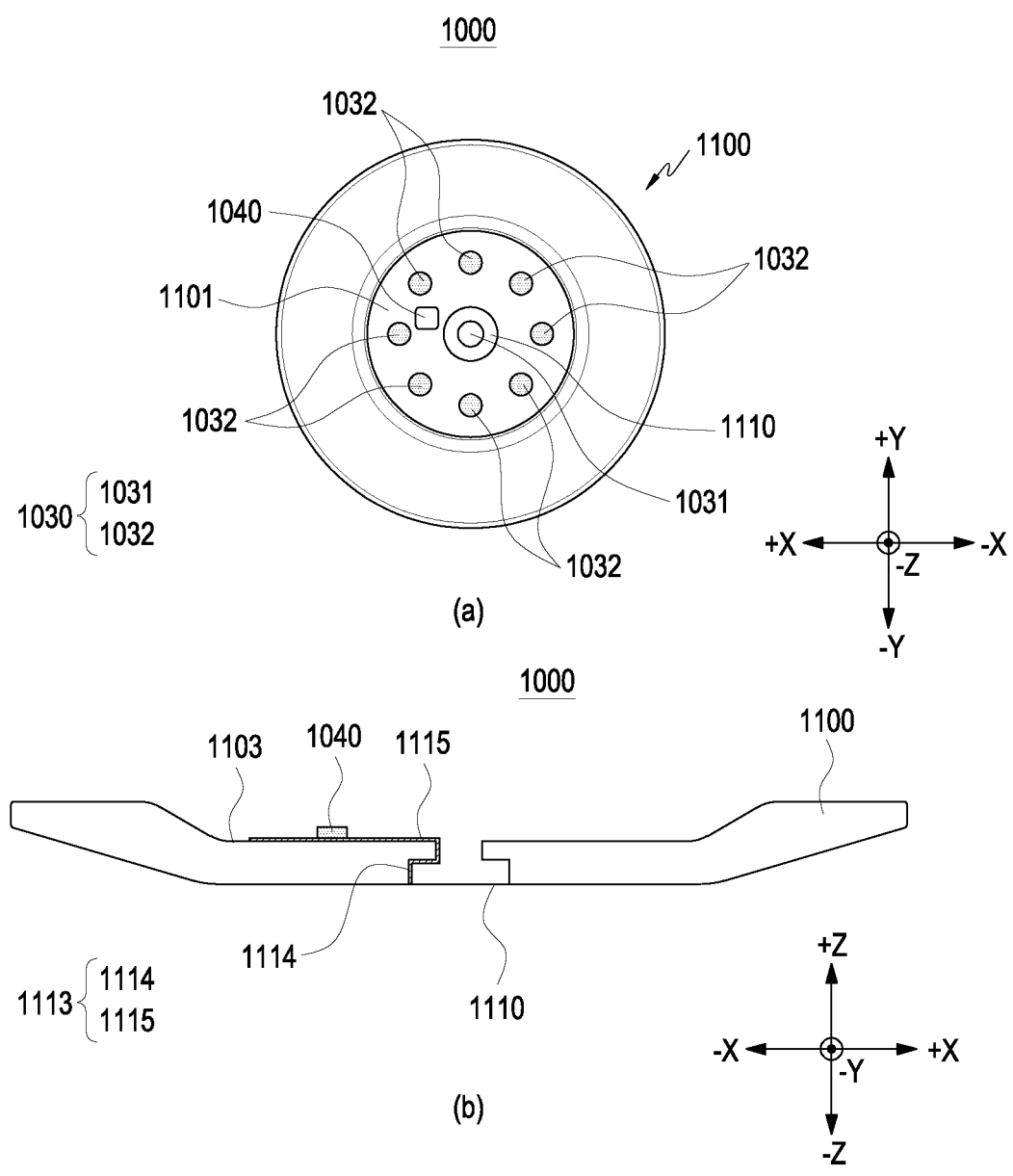
FIG. 12 is a view illustrating an arrangement relationship of sensor modules according to an embodiment.

FIG. 12 is a view illustrating an arrangement relationship of sensor modules according to an embodiment.

Referring to FIG. 12, an electronic device 1000 may include a first sensor 1030, a second sensor 1040, a conductive member 1113, and a support member 1100. For the descriptions of the electronic device 1000, the first sensor 1030, the second sensor 1040, and the support member 1100 of FIG. 12, the descriptions of the electronic devices 400 and 600, the sensors 430 and 630, the second sensors 440 and 640, and the support members 500, 700 and 900 of the above-described embodiments may be applied mutatis mutandis.

According to an embodiment, a light-emitting element 1031 may be disposed in the first area 1101, and a light-receiving element 1032 may be disposed to surround the light-emitting element 1031. For example, a plurality of light-receiving elements 1032 may be disposed to surround the light-emitting element 1031. In an embodiment, a second sensor 1040 may be disposed adjacent to the light-emitting element 1031 and the light-receiving element 1032. For example, the second sensor 1040 may be disposed between the light-emitting element 1031 and the light-receiving element 1032 when the electronic device 1000 is viewed from above (in parallel to the z-axis). However, this is only an example, and various arrangement modifications are possible.

According to an embodiment, the second sensor 1040 may be disposed adjacent to the sensor hole 1110. In an embodiment, the second sensor 1040 may be disposed around the sensor hole 1110 without being inserted into the sensor hole 1110. For example, the second sensor 1040 may be disposed not to overlap the sensor hole 1110 (outside the sensor hole) when the electronic device 1000 is viewed from above (in parallel to the z-axis).

According to an embodiment, the conductive member 1113 may provide a path through which a heat or electrical signal is transmitted from an area around the sensor hole 1110 to the second sensor 1040. The conductive member 1113 may include a first conductive member 1114 and a second conductive member 1115. In an embodiment, the first conductive member 1114 may be disposed along the inner wall of the support member 1100 corresponding to the sensor hole 1110. In addition, the second conductive member 1115 may be disposed on the inner surface 1103 of the support member 1100 adjacent to the second sensor 1040. In an embodiment, the first conductive member 1114 and the second conductive member 1115 may be connected to each other. In an embodiment, the first conductive member 1114 and the second conductive member 1115 may be integrally formed. As heat or electrical signals from the exterior of the electronic device 1000 are transferable to the second sensor 1040 via the conductive member 1113, the degree of freedom of arrangement of the second sensor 1040 may be improved. For example, the conductive member 1113 may include the same material as the above-described conductive material (e.g., the conductive material 514a in FIGS. 6A to 6C), or may include a metal material and/or a conductive filler (e.g., silver paste). In an embodiment, the first conductive member 1114 may be formed of a metal material, and the second conductive member 1115 may be formed of a conductive filler. However, this is only a portion of the an embodiment of the present disclosure, the spirit of the present disclosure is not limited thereto, and various modifications are possible.

Figure 13:
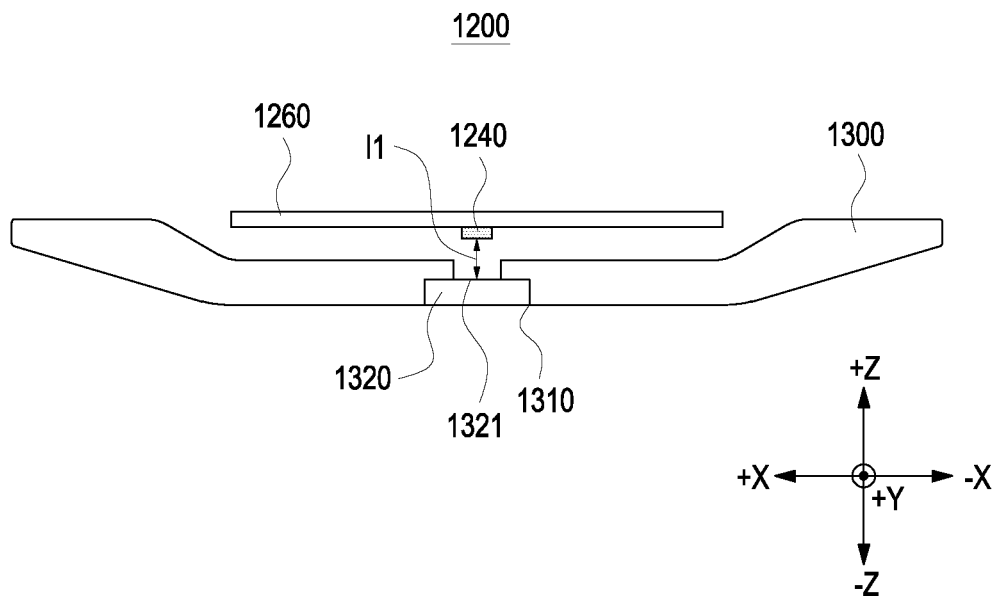
FIG. 13 is a view illustrating an arrangement structure of an electronic device according to an embodiment.

FIG. 13 is a view illustrating an arrangement structure of an electronic device 1200 according to an embodiment.

Referring to FIG. 13, an electronic device 1200 may include a support member 1300, a circuit board 1260, a second sensor 1240, and a shield member 1320. Although not illustrated in the figure, it will be understood that the electronic device 1200 may further include a first sensor (e.g., the first sensor 430 in FIG. 5). For the descriptions of the electronic device 1200, the support member 1300, the circuit board 1260, and the shield member 1320 of FIG. 13, the descriptions of the electronic devices 400, 600, and 1000, the support member 500, 700, 900, and 1100, and the circuit boards 460 and 660 of the above-described embodiments may be applied mutatis mutandis.

According to an embodiment, the second sensor 1240 may be a non-contact-type body temperature sensor. For example, the non-contact-type body temperature sensor may refer to a sensor configured to measure a temperature by detecting infrared rays. However, this is an example, and the second sensor 1240 should be comprehensively interpreted as all types of non-contact-type temperature sensors that may be implemented to achieve the purpose of the present disclosure. In an embodiment, the second sensor 1240 may be disposed to be spaced apart from the shield member 1320 by a predetermined distance 11. For example, the predetermined distance 11 may have a range of approximately 1 to 3 mm. As another example, the second sensor 1240 may be expressed to be disposed to be spaced apart from the top surface (the surface 1321 in the +z-axis direction) of the shield member 1320 closest to the second sensor 1240 by approximately 1 to 3 mm.

According to an embodiment, the shield member 1320 may be disposed to block the sensor hole 1310. In an embodiment, when the second sensor 1240 is implemented as a non-contact-type body temperature sensor, the shield member 1320 may be formed of a material that is capable of transmitting infrared rays. For example, the shield member 1320 may include at least one of zinc sulfide (ZnS), zinc selenide (ZnSe), diamond, silicon (Si), and/or germanium (Ge).

Figure 14:
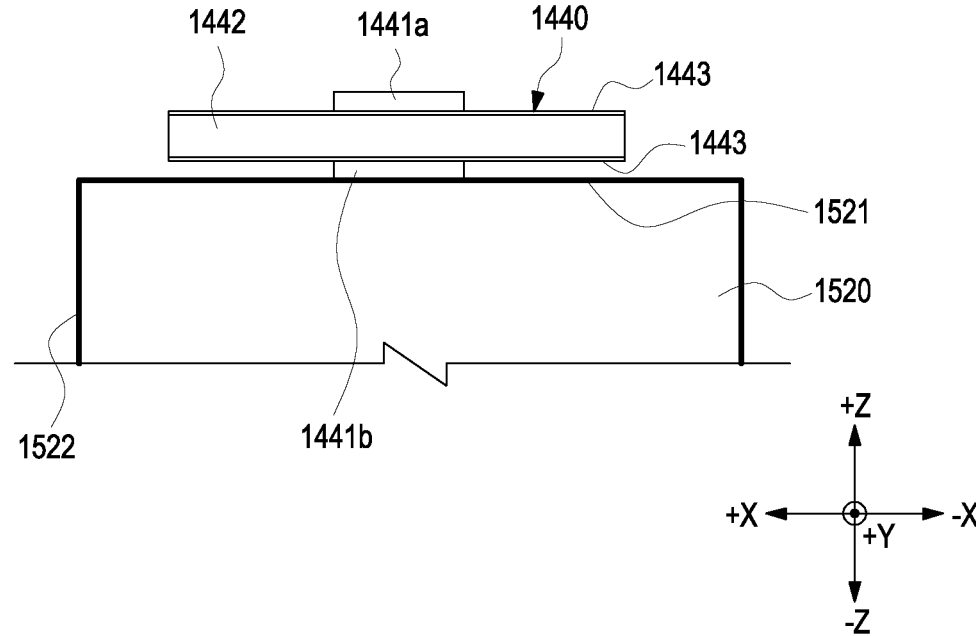
FIG. 14 is a view illustrating an example implementing a body temperature sensor according to an embodiment.

FIG. 14 is a view illustrating an example implementing a body temperature sensor according to an embodiment.

Referring to FIG. 14, the second sensor 1440 may have a heat flux sensor structure. For the description of the second sensor 1440 of FIG. 14, the descriptions of the second sensors 440, 640, 1040, and 1240 in the above-described embodiments may be applied mutatis mutandis.

According to an embodiment, the second sensor 1440 may include a heat-conducting member 1442. For example, the heat-conducting member 1442 may be formed of a non-conductive material. The upper portion (the +z-axis direction) and the lower portion (the −z-axis direction) of the heat-conducting member 1442 may be coated with a conductor 1443.

According to an embodiment, the second sensor 1440 may further include a pair of thermistors 1441a and 1441b. In an embodiment, the first thermistor 1441a may be disposed on the top surface (the surface in the +z-axis direction) of the second sensor 1440 coated with the conductor 1443.

In addition, the second thermistor 1441b may be disposed on the bottom surface (the surface in the −z-axis direction) of the second sensor 1440 coated with the conductor 1442. As another example, the first and second thermistors 1441a and 1441b may be disposed to face the heat-conductive member 1442 coated with the conductor 1443.

According to an embodiment, the second thermistor 1441b may be in contact with at least a portion of the shield member 1520. In an embodiment, the top surface 1521 (the surface in the +z-axis direction) of the shield member 1520 may be in contact with the second thermistor 1441b, and may transfer heat from the exterior of the electronic device (e.g., the electronic device 400 in FIGS. 6A to 6C) to the second thermistor 1441b. In an embodiment, the surface of the shield member 1520 may be coated with a conductive material 1522 to improve conductivity between the shield member 1520 and the second thermistor 1441b. For example, the conductive material 1522 may be double-sided metal tape.

According to an embodiment, it is possible to provide an electronic device including: a housing (e.g., the support member 500 in FIGS. 6A to 6C) including a first area (e.g., the first area 501 in FIGS. 6A to 6C) configured to transmit light and a sensor hole (e.g., the sensor hole 503 in FIGS. 6A to 6C) formed in the first area; a circuit board (e.g., the circuit board 460 in FIG. 7) disposed inside the housing; a first sensor (e.g., the second sensor 440) connected to the circuit board; and a shield member (e.g., the sensor shield member 550 in FIGS. 6A to 6C) configured to block the sensor hole and provide a heat transfer path from the exterior of the housing to the first sensor, wherein a conductive material (e.g., the conductive material 514a in FIG. 7) is disposed in at least a portion of the housing surrounding the sensor hole.

According to an embodiment, it is possible to provide the electronic device in which the first sensor is a body temperature measurement sensor.

According to an embodiment, it is possible to provide the electronic device in which the sensor hole may include a first opening area (e.g., the first opening area 511 in FIG. 7) connected to the exterior of the housing and a second opening area (e.g., the second opening area 512 in FIG. 7) extending from the first opening area and connected to the interior of the housing, and the first sensor is disposed within the second opening area, and the shield member is disposed in the first opening area.

According to an embodiment, it is possible to provide the electronic device in which a width of the first opening area is larger than a width of the second opening area.

According to an embodiment, it is possible to provide the electronic device further including a second sensor (e.g., the first sensor 430 in FIG. 9) connected to the circuit board and disposed adjacent to the first sensor, wherein the second sensor includes a light-emitting element (e.g., the light-emitting element 431 in FIG. 9) and a light-receiving element (e.g., the light-receiving element 432 in FIG. 9).

According to an embodiment, it is possible to provide the electronic device in which the light-emitting element and the light-receiving element are disposed to surround the first sensor.

According to an embodiment, it is possible to provide the electronic device further including an auxiliary hole (e.g., the auxiliary hole 504 in FIGS. 6A to 6C) provided in the first area and an auxiliary shield member (e.g., the auxiliary shield member 506 in FIGS. 6A to 6C) configured to block the auxiliary hole, and the light-emitting element is disposed in the auxiliary hole.

According to an embodiment, it is possible to provide the electronic device in which the auxiliary shield member is formed of a light-transmitting material, and the shield member is formed of a light-blocking material.

According to an embodiment, it is possible to provide the electronic device in which the housing includes a second area (e.g., the second area 502 in FIGS. 6A to 6C) disposed to surround the first area and configured to block light, and the first sensor and the second sensor may be disposed to overlap the first area.

According to an embodiment, it is possible to provide the electronic device in which the first sensor is disposed inside the housing not to overlap the sensor hole, and the electronic device further includes a conductive member (e.g., the conductive member 1113 of FIG. 12) extending from at least a partial area of the housing corresponding to the sensor hole to the first sensor.

According to an embodiment, it is possible to provide the electronic device further including a connector (e.g., the connector 421 in FIG. 7) configured to connect with the first sensor and the circuit board.

According to an embodiment, it is possible to provide the electronic device in which the first area and the second area are integrally formed.

According to an embodiment, it is possible to provide an electronic device including: a housing (e.g., the support member 500 in FIGS. 6A to 6C) including a first area (e.g., the first area 501 in FIGS. 6A to 6C) provided to transmit light and a sensor hole (e.g., the sensor hole 503 in FIGS. 6A to 6C) formed in the first area; a circuit board (e.g., the circuit board 460 in FIG. 7) disposed inside the housing; a first sensor (e.g., the second sensor 440 in FIGS. 6A to 6C) electrically connected to the circuit board and disposed inside the housing; a second sensor (e.g., the first sensor 430 in FIGS. 6A to 6C) disposed to overlap the first area and including a light-emitting element and a light-receiving element; and a shield member (e.g., the shield member 520 in FIG. 7) configured to block the sensor hole and provide a heat transfer path from the exterior of the housing to the first sensor, wherein a conductive material for heat conduction is disposed in at least a portion of the housing surrounding the sensor hole.

According to an embodiment, it is possible to provide the electronic device in which the first sensor is a body temperature measurement sensor.

According to an embodiment, it is possible to provide the electronic device in which the light-emitting element and the light-receiving element are disposed to surround the first sensor.

According to an embodiment, it is possible to provide the electronic device in which the housing further includes a second area (e.g., the second area 502 in FIGS. 6A to 6C) disposed around the first area, and the second area includes a light-blocking material configured to light incident on the light-receiving element.

According to an embodiment, it is possible to provide the electronic device further including an optical film (e.g., the optical film 800 in FIGS. 10A and 10B) disposed adjacent to the light-emitting element.

According to an embodiment, it is possible to provide the electronic device in which the optical film may include a light-emitting area (e.g., the light-emitting areas 802*a* and 802*b* in FIGS. 10A and 10B) capable of arranging to overlap the light-emitting element and a light-receiving area (e.g., light-receiving area 801 in FIGS. 10A and 10B) capable of arranging to overlap the light-receiving element, and the light-emitting area and the light-receiving area include a Fresnel structure.

According to an embodiment, it is possible to provide the electronic device in which the first sensor is a non-contact body temperature sensor, and the first sensor is disposed to be spaced apart from the shield member by a predetermined interval (e.g., the predetermined interval 11 in FIG. 13).

According to an embodiment, it is possible to provide the electronic device in which the first area is formed of at least one of glass, sapphire, plastic, and transparent ceramic.

According to an embodiment, it is possible to provide an electronic device including: a support member including a sensor hole that defines a first opening area and a second opening area; a sensor disposed in the second opening area; a shield member disposed in the first opening area, the shield member configured to provide a heat transfer path to the sensor; and a conductive material disposed in the sensor hole and configured to conduct heat.

According to an embodiment, it is possible to provide the electronic device further including: a circuit board coupled to the support member; and a connector which connects the sensor to the circuit board.

According to an embodiment, it is possible to provide the electronic device further including: a conductive material on one or both of a first inner surface defined by the first opening area and a second inner surface defined by the second opening area.

According to an embodiment, it is possible to provide the electronic device in which a first surface of the sensor faces the circuit board and a second surface of the sensor opposite the first surface faces the shield member.

According to an embodiment, it is possible to provide the electronic device in which the shield member contacts the second surface of the shield member.

It may be apparent to a person ordinarily skilled in the technical field to which the disclosure belongs that the above-described electronic device according to the disclosure is not limited by the above-described embodiments and drawings, and can be variously substituted, modified, and changed within the technical scope of the disclosure.

EXPLANATION OF REFERENCE NUMERALS

400: electronic device, 500: support member, 430: first sensor, 440: a second sensor, 520: shield member

What is claimed is:

1. An electronic device comprising:
   a housing including a first area provided to transmit light and a sensor hole formed in the first area;
   a circuit board disposed inside the housing;
   a first sensor connected to the circuit board and disposed in at least a portion of the sensor hole; and
   a shield member configured to block the sensor hole and prevent foreign matter from being introduced through the sensor hole,
   wherein a conductive material for heat conduction is coated on an inner surface of the sensor hole.

2. The electronic device of claim 1, wherein the first sensor is a body temperature measurement sensor.

3. The electronic device of claim 1, further comprising a connector configured to connect with the first sensor and the circuit board.

4. The electronic device of claim 1, wherein the sensor hole comprises a first opening area connected to the exterior of the housing and a second opening area extending from the first opening area and connected to an interior of the housing, the first sensor is disposed within the second opening area, and the shield member is disposed in the first opening area.

5. The electronic device of claim 4, wherein a width of first opening area is larger than a width of the second opening area.

6. The electronic device of claim 1, further comprising a second sensor connected to the circuit board and disposed adjacent to the first sensor, wherein the second sensor comprises a light-emitting element and a light-receiving element.

7. The electronic device of claim 6, wherein the light-emitting element and the light-receiving element are disposed to surround the first sensor.

8. The electronic device of claim 6, wherein the housing further comprises an auxiliary hole provided in the first area and an auxiliary shield member configured to block the auxiliary hole, and wherein the light-emitting element is disposed in the auxiliary hole.

9. The electronic device of claim 8, wherein the auxiliary shield member is made of a light-transmitting material, and wherein the shield member is made of a light-blocking material.

10. The electronic device of claim 6, wherein the housing comprises a second area disposed to surround the first area and configured to block light, and the first sensor and the second sensor are disposed to overlap the first area.

11. The electronic device of claim 10, wherein the first area and the second area are integrally formed.

12. An electronic device comprising:

a housing including a first area provided to transmit light and a sensor hole formed in the first area;

a circuit board disposed inside the housing;

a first sensor electrically connected to the circuit board, the first sensor disposed in at least a portion of the sensor hole;

a second sensor disposed to overlap the first area and including a light-emitting element and a light-receiving element; and a shield member configured to block the sensor hole and prevent foreign matter from being introduced through the sensor hole, wherein a conductive material for heat conduction is coated on an inner surface of the sensor hole.

13. The electronic device of claim 12, wherein the first sensor is a body temperature sensor.

14. The electronic device of claim 12, wherein the light-emitting element and the light-receiving element are disposed to surround the first sensor.

15. The electronic device of claim 12, wherein the housing further comprises a second area disposed around the first area, and wherein the second area comprises a light-blocking material to block light incident on the light-receiving element.

16. The electronic device of claim 12, wherein the first area is made of at least one of glass, sapphire, plastic, or transparent ceramic.

17. The electronic device of claim 12, further comprising an optical film disposed adjacent to the light-emitting element.

18. The electronic device of claim 17, wherein the optical film comprises a light-emitting area capable of arranging to overlap the light-emitting element and a light-receiving area capable of arranging to overlap with the light-receiving element, and wherein the light-emitting area and the light-receiving area comprise a fresnel structure.

* * * * *